United States Patent
Pelton

(10) Patent No.: US 8,980,195 B2
(45) Date of Patent: Mar. 17, 2015

(54) SYSTEMS AND METHODS FOR CONTROLLING TRANSPORT REACTORS

(75) Inventor: Jerome Pelton, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 841 days.

(21) Appl. No.: 13/207,543

(22) Filed: Aug. 11, 2011

(65) Prior Publication Data

US 2013/0041195 A1    Feb. 14, 2013

(51) Int. Cl.
| | |
|---|---|
| *C10G 11/16* | (2006.01) |
| *C10J 3/48* | (2006.01) |
| *B01J 8/18* | (2006.01) |
| *C10J 3/56* | (2006.01) |
| *C10G 11/18* | (2006.01) |

(52) U.S. Cl.
CPC .............. *B01J 8/1809* (2013.01); *B01J 8/1818* (2013.01); *B01J 2208/00539* (2013.01); *C10J 3/485* (2013.01); *C10J 3/56* (2013.01); *C10G 11/18* (2013.01); *C10J 2300/1807* (2013.01)
USPC ........................................................ 422/214

(58) Field of Classification Search
CPC ................. C10J 1/46; C10J 3/48; C10J 3/56; B01J 8/1809; B01J 8/1818; B01J 8/1827; B01J 8/1863; B01J 2208/00539

USPC ........................................................ 422/214
See application file for complete search history.

(56) References Cited

U.S. PATENT DOCUMENTS

| | | | |
|---|---|---|---|
| 3,012,962 A * | 12/1961 | Dygert | ........................ 208/154 |
| 5,298,155 A | 3/1994 | Sabottke | |
| 5,402,631 A | 4/1995 | Wulf | |
| 5,485,719 A | 1/1996 | Wulf | |
| 6,116,027 A | 9/2000 | Smith et al. | |
| 2009/0188165 A1 | 7/2009 | Ariyapadi | |
| 2010/0186447 A1 | 7/2010 | Straver | |

FOREIGN PATENT DOCUMENTS

| | | |
|---|---|---|
| EP | 0512568 A1 | 11/1992 |
| EP | 0620363 A1 | 10/1994 |

* cited by examiner

*Primary Examiner* — Lessanework Seifu

(74) *Attorney, Agent, or Firm* — Gary M. Machetta

(57) ABSTRACT

Systems and methods for operating transport reactors are provided. The method can include fluidizing one or more particulates within a transport reactor. The one or more particulates can include one or more carbonaceous materials. The method can also include maintaining one or more pressure differentials between two or more points within the transport reactor using at least one integrally geared compression system. The at least one integrally geared compression system can include a bull gear, at least one pinion, and two or more compressors.

19 Claims, 3 Drawing Sheets

US 8,980,195 B2

SYSTEMS AND METHODS FOR CONTROLLING TRANSPORT REACTORS

BACKGROUND

1. Field

Embodiments described herein generally relate to systems and methods for controlling transport reactors.

2. Description of the Related Art

Transport reactors circulate one or more materials (fluids, solids/particulates, and/or mixtures thereof) throughout one or more reaction loops to convert feedstocks, typically hydrocarbons, into desired products and/or bi-products. The transport reactors use pressurized and/or compressible fluid(s) to circulate or move the material(s) throughout the reaction loops. The reaction loops typically contain one or more reaction zones where at least some of the feedstock conversion takes place. Movement of the material through the reaction zones improves the conversion of the feedstock.

To keep the material moving throughout the reaction loop (s), a pressure differential is maintained between several sets of points about the reaction loops. The combination of the various pressure differentials is commonly referred to as a pressure profile for the transport reactor. The pressure profile is typically maintained by a control system and a complex series of compressors, pressure regulators, pressure instruments, data feedback loops, and/or servo-motor feedback loops.

In typical transport reactors, the resident pressure instruments or devices measure the pressure at a different location throughout the reaction loop. The pressure measurements are fed back to the control system and the control system sends commands to the various compressors and/or pressure regulators to adjust their settings to maintain the transport reactor pressure profile within operating parameters. Response dependent feedback control loops of the type described above are complex, expensive, and difficult to implement, optimize, operate, and/or service.

There is a need, therefore, for improved systems and methods for maintaining pressure differentials or pressure profiles within transport reactors.

DETAILED DESCRIPTION

Figure 1:
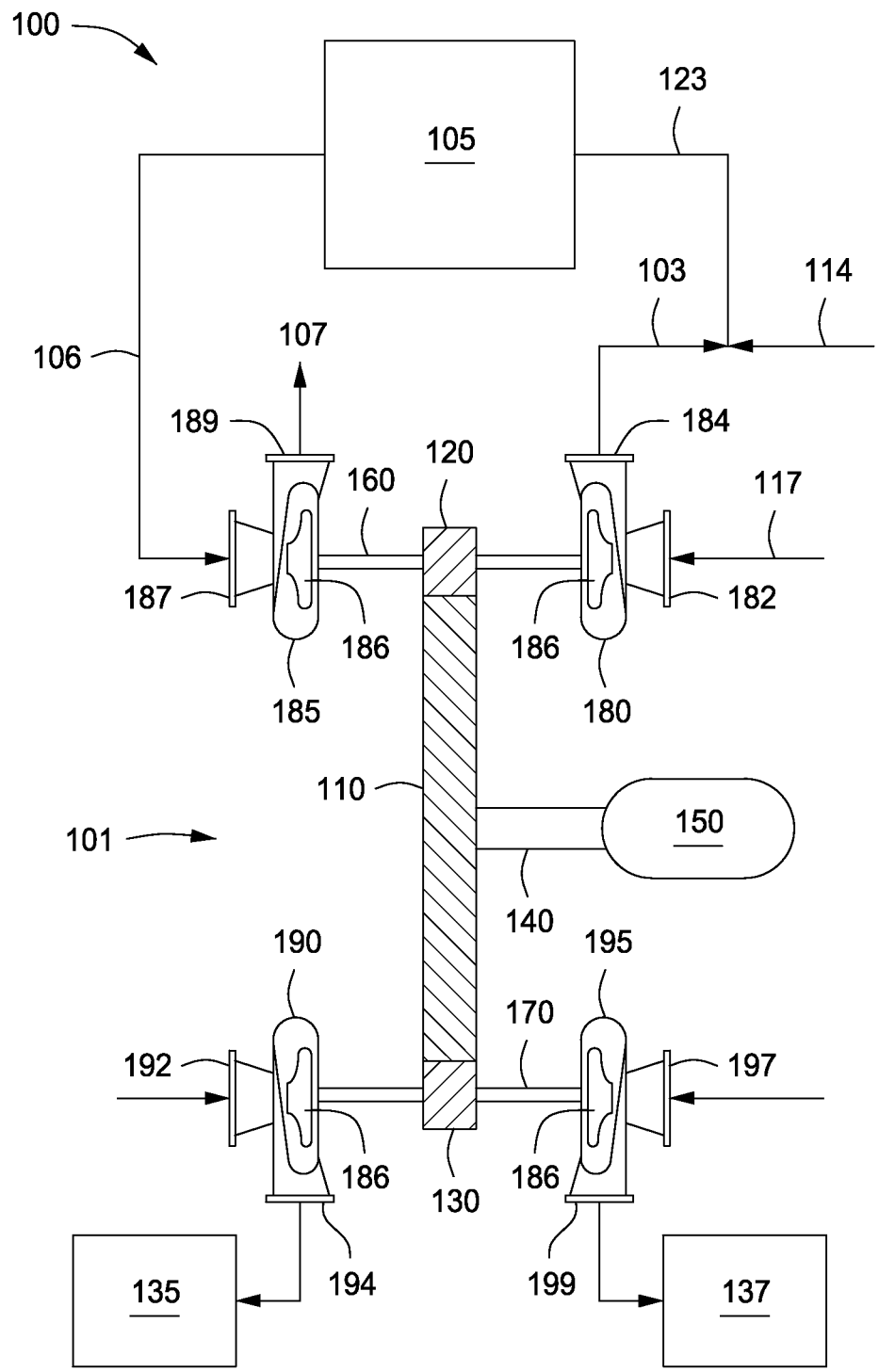
FIG. 1 depicts a schematic view of an illustrative transport reactor system, according to one or more embodiments described.

FIG. 1 depicts a schematic view of an illustrative transport reactor system 100, according to one or more embodiments. The transport reactor system 100 can include, but is not limited to, one or more integrally geared compression (IGC) systems 101 (one is shown) and one or more transport reactors 105. Generally, transport reactors, for example transport reactor 105, operate by maintaining a circulation flow therethrough. The integrally geared compression system 101 can be used to maintain a predetermined circulation flow rate through the transport reactor 105 by maintaining some or all of the pressure differentials between inlets and/or outlets within the transport reactor 105, sometimes referred to as "a moving bed reactor." In other words, the recirculation rate and residence times of fluids, solids, or a solid/fluid mixture within the transport reactor 105 can be maintained by the integrally geared compression system 101. Maintaining the pressure differentials between most or all of the inlets and/or outlets of the transport reactor 105 is sometimes referred to as maintaining the operational pressure profile of a system, for example the transport reactor 105.

To maintain the pressure differentials, the integrally geared compression system 101 can provide materials to and/or receive materials from the transport reactor 105 at sustained known pressure differentials using the mechanical advantage associated with two or more compressors operating from a single bull gear. In the case where two or more integrally geared compression systems 101 are utilized to maintain the known pressure differentials between one or more transport reactors 105, the mechanical advantage associated with two or more bull gears sized to provide sustained known pressure differentials between two or more compressors can be exploited. For example, the integrally geared compression system 101 can circulate one or more primary fluids and/or secondary fluids to/from the transport reactor 105 between two or more inlets and/or outlets at sustained predefined pressure differentials. As used herein, the term "primary fluid" refers to main process fluids introduced to the transport reactor 105. The main process fluids can include, but are not limited to, one or more feedstocks, one or more oxidants, steam, one or more catalysts, one or more sorbents, nitrogen, and/or air. As used herein, the term "secondary fluid" refers to additional fluids introduced to one or more inlets of the transport reactor 105 to function as purges, supplemental motive fluids, and/or for other purposes. The secondary fluids can be the same fluids as the primary fluids or they can be different. The secondary fluids can be introduced into the transport reactor at higher pressures than any one or more of the primary fluids.

For operation, a first fluid via line 117 can be introduced to a compressor 180 of the integrally geared compression system 101 to produce a compressed first fluid that can be introduced as a feedstock in line 103, or alternatively blended as a feedstock in line 114, to provide a pressurized feedstock in line 123 and/or to promote transport or movement of the feedstock in lines 103, 114, 123 into the transport reactor 105. The particular pressure of the compressed first fluid via line 103 can be pre-determined based on the compressor 180 and its arrangement within the integrally geared compression system 101. The feedstock introduced via line 123 to the transport reactor 105 can be converted to one or more products and recovered via line 106 therefrom. As shown, the product(s) via line 106 can be recovered and compressed to another predetermined pressure within a compressor 185 of the integrally geared compression system 101 for recovery via line 107.

The integrally geared compression system 101 can also control the pressure of at least one input or one output from another transport reactor 135 and/or another processing system/device 137. The transport reactor 135 and/or the other processing system 137 can operate in relation to one another and/or the transport reactor 105 or can operate independent from one another and/or the transport reactor 105.

Each integrally geared compression system 101 can include one or more bull gears (one is shown 110), one or more pinions (two are shown 120, 130), and one or more compressors (four are shown, 180, 185, 190, and 195). Although even numbers of pinions 120, 130, and compressors 180, 185, 190, and 195 are depicted, there can be any number of pinions and compressors included in the integrally geared compression system 101. The bull gear 110 can be wheel or disc shaped having one or more projections disposed about an outer edge thereof and/or about any surface thereof. The projections can be teeth that can be formed with appropriate size and spacing such that the teeth can mesh with a second set of teeth formed on another part of the integrally geared compression system 101, for example, the pinions 120, 130. The teeth can transmit and/or receive force. The bull gear 110 can be coupled or otherwise interconnected to one or more power sources for rotating the bull gear 110. For example, one or more motors (one is shown 150) can be coupled via one or more drive shafts 140. As used herein, the terms "connect," "connection," "connected," "in connection with," "interconnect," "interconnected," and "connecting" can be used interchangeably with one another and refer to "in direct connection with" or "in connection with via another pinion, compressor, component, and/or assembly."

The pinions 120 and 130 can be wheel or disc shaped. The pinions 120 and 130 can have the same or different cross-sectional lengths, e.g., diameters. One or more of the pinions 120, 130 can have a cross-sectional length larger than, equal to, or less than the cross-sectional length of the bull gear 110. The pinions 120 and 130 can include projections disposed about an outer edge thereof. The projections disposed on the pinions 120 and 130 can be a second and third set of teeth, respectively, that can be formed with appropriate size and spacing such that the second and third sets of teeth can couple or mesh with the teeth disposed about the outer edge and/or any other surface of the bull gear 110. The pinions 120 and 130 can be positioned anywhere about the outer perimeter, e.g., circumference, of the bull gear 110. The second and third sets of teeth can be meshed with the teeth formed on the bull gear 110. The meshed teeth can transmit and/or receive force and motion between the pinions 120 and 130 and the bull gear 110. The pinions 120 and 130 can be interconnected with the one or more compressors 180, 185 and 190, 195, respectively, via one or more shafts (two are shown, 160 and 170 respectively).

The compressors 180, 185, 190, 195 can include any type of compressor or combination of compressors. The compressors 180, 185, 190, 195 can be centrifugal compressors each including one or more impellers 186. Other illustrative compressors can include, but are not limited to, axial compressors, rotary positive displacement compressors, diagonal or mixed-flow compressors, reciprocating compressors, dry screw compressors, oil flooded screw compressors, scroll compressors, and the like. The compressors 180, 185, 190, 195 can be separate compressors or a single compressor having three or more compression stages. The compressors 180, 185, 190, 195 can be the same type of compressor or different. For example, the compressors 180, 185, 190, 195 can all be reciprocating compressors. In another example, the compressor 180 can be a dry screw compressor and the compressors 185, 190, and 195 can be reciprocating compressors. The one or more compressors 180, 185, 190, 195 can each include one or more impellers 186 (one is shown in each) disposed therein. The one or more compressors 180, 185, 190, 195 can also each include one or more inlets 182, 187, 192, 197 and one or more outlets 184, 189, 194, 199, respectively.

The motor 150 can be an electric motor, an internal combustion motor (e.g., gasoline or diesel powered), a gas combustion motor (e.g., natural gas and/or syngas powered), an internal combustion turbine, a gas combustion turbine, a gas-electric hybrid motor, or any motor capable of imparting a force on the bull gear 110. Although not shown, the motor can be powered by a separate power source or can be powered by a portion of the raw product 107 discharged or otherwise recovered from the transport reactor 105. For example and without limitation, the motor 150 can be an internal combustion motor and a portion of the raw product 107 can be at least partially combusted in the motor 150 to provide a motive force for the motor 150. Without limitation, the motor 150 can be a gas combustion turbine and a portion of the raw product 107 can be at least partially combusted in the motor 150 to provide a motive force for the motor 150.

In operation, the bull gear 110 can be actuated by the motor 150 via the drive shaft 140 and can rotate about a central axis (not shown). The bull gear 110 can rotate about the central axis at speeds from about 1 revolution per minute (rpm) to about 1,800 rpm or about 8,000 rpm or more. The bull gear 110 can rotate about the central axis at speeds of from about 1,800 rpm to about 9,000 rpm. For example, the bull gear 110 can rotate at speeds from about 900 rpm to about 5,000 rpm, about 100 rpm to about 6,000 rpm, or about 1,500 rpm to about 9,000 rpm.

The pinions 120 and 130 and shafts 160 and 170 can be actuated by the bull gear 110. The shafts 160 and 170 can directly (as shown) or indirectly (not shown) drive the one or more impellers 186 in the one or more compressors 180, 185, 190, 195. The pinions 120 and 130 can be actuated by the rotation of the bull gear 110. The pinions 120 and 130 can rotate at the same or different speeds with respect to one another. For example, pinions 120 and 130 having the same cross-sectional length can rotate at about the same speed. In another example, pinions 120 and 130 having different cross-sectional lengths can rotate at different speeds with respect to one another. The pinions 120 and 130 can rotate at speeds of about 1 rpm to about 8,000 rpm. The pinions 120 and 130 can rotate at speeds of about 1,200 rpm to about 50,000 rpm. For example, the pinions 120 and 130 can rotate at speeds of about 21,600 rpm to about 36,000 rpm, about 10,000 rpm to about 30,000 rpm, or about 5,000 rpm to about 50,000 rpm.

The one or more impellers 186 can impart velocity and pressure on a fluid introduced via inlets 182, 187, 192, 197 to each of the one or more compressors 180, 185, 190, 195 respectively. For example, the fluid can be introduced to the inlet 187 of the second compressor 185 and the impeller 186 can impart velocity and pressure on the fluid to create a discharge fluid, e.g., the raw product via line 107. The discharge fluid can be discharged from the outlet 189. The discharge fluid can have a higher pressure than the fluid introduced to the inlet 187.

The compression ratio for each compressor 180, 185, 190, 195 can be the same or different. Each compressor 180, 185, 190, 195 can operate independently or can operate in concert with one or more of the other compressors. For example, each compressor 180, 185, 190, 195 can be a compression stage within a compression path (not shown). The integrally geared compression system 101 can be a multi-stage compressor. The compression ratios between compressors can be equal step ratios or can be selected or set by the process parameters of the transport reactor 105. For example, the integrally geared compression system 101 can be a 4-stage compressor designed to operate at about 963.4 kPa with an inlet pressure of about 98.6 kPa. The overall compression ratio for such a 4-stage compressor can be about 1:9.8. For equal steps, the compression ratio per stage can be calculated as the fourth root of 9.768 or 1.768. The discharge pressure of each stage would be: Stage 1 (1.768)(98.6 kPa)=174.316 kPa, Stage 2 (1.768)(174.316 kPa)=308.191 kPa, Stage 3 (1.768)(308.191 kPa)=544.881 kPa, Stage 4 (1.768)(544.881 kPa)=963.350 kPa. There can be compression steps prior to or after the integrally geared compression system 101. For example, the first fluid via line 117 may need to be stepped through multiple stages of compression before entering the integrally geared compression system 101. One or more inter-stage coolers (not shown) can be used to cool fluids between the one or more compression stages.

The motor amperage of the motor 150 can be used to determine, mass flow and/or pressure through the integrally geared compression system 101. For example, when air is moved through an integrally geared compression system 101, the amount of air moving through the integrally geared compression system 101 can be determined in terms of a certain weight of air per minute. In one or more embodiments, motor amperage can increase at a constant compression ratio proportionate to a change in mass. To control the mass flow through the integrally geared compression system 101, an guide vein or inlet valve (not shown) can be used to throttle the flow of fluid into the compressor. For example, a 70.79 cubic meter per minute (cmm) compressor on a standard day may have its inlet valve open at 90%. At this valve position, the example compressor can handle 85.05 kilograms of air every minute. If the ambient conditions change, the weight of the air per cubic meter will increase or decrease. For example, if there is a decrease in temperature or an increase in barometric pressure, the weight of the air per cubic meter will increase. If the maximum allowable motor amperage is set at 200 amps and that maximum amperage equates to 85.05 kilograms of air/min, then the inlet valve could be throttled to maintain the same mass flow under the new ambient conditions. In other words, the inlet valve position could be actuated to something less than 90% open. Similarly, if there is an increase in temperature or a decrease in barometric pressure, the inlet valve can be actuated to something greater than 90%.

Processes utilizing the transport reactor 105 can include single loop and/or multi-loop transport reactor systems with one or more primary and, optionally, one or more secondary fluids for supporting fluid/particulate mixture transport or movement through the transport reactor systems 100. The transport reactor 105 can be or include any type of reaction loop or combination of reactions loops. Illustrative reactions that can occur within the transport rector 105 can include, but are not limited to, gasification, catalytic conversion of solid hydrocarbons to liquid and/or gaseous hydrocarbons, hydrocarbon purification, desulfurization, hydrotreating, heavy oil cracking, catalyst regeneration, absorption, desorption, methanation, or any combination thereof. For example, the transport reactor 105 can be or include one or more gasifiers, at least one example of which is discussed and described below with reference to FIG. 2. In another example, the transport reactor 105 can be or include one or more fluidized catalytic cracking (FCC) reactors, at least one example of which is discussed and described below with reference to FIG. 3. Other examples of suitable transport reactors 105 can include, but are not limited to, one or more coal liquefaction reactors and/or one or more sulfur removal reactors, which can be as discussed and described in U.S. Pat. Nos. 3,540,995 and 3,900,390, respectively.

Figure 2:
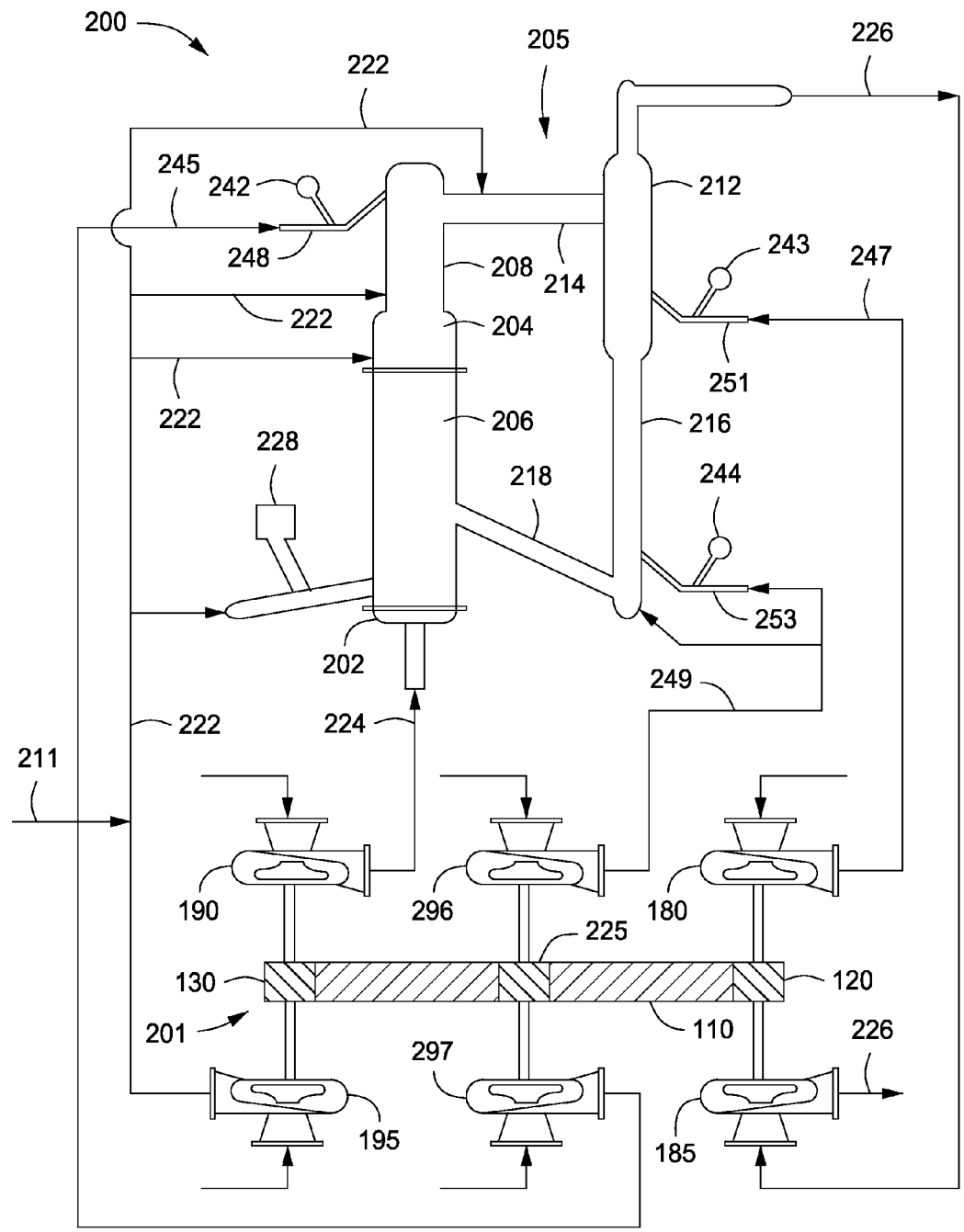
FIG. 2 depicts a schematic view of an illustrative gasification system, according to one or more embodiments described.

FIG. 2 depicts a schematic view of an illustrative gasification system 200, according to one or more embodiments. The gasification system 200 can include one or more gasifiers 205 and one or more integrally geared compression systems 201. The integrally geared compression system 201 can be similar to the integrally geared compression system 101 discussed and described above with reference to FIG. 1. As shown, the integrally geared compression system 201 can further include additional compressors 296 and 297. The additional compressors 296 and 297 can be interconnected to the bull gear 110 via a pinion 225 and actuated at least by the interaction of the pinion 225 and the bull gear 110. As will be further discussed and described below, the integrally geared compression system 201 can be used to maintain one or more pressure differentials between at least one set of points and/or can maintain the operational pressure profile of the gasifier 205. Two or more integrally geared compression systems 201 (not shown) can be used to maintain the one or more pressure differentials and/or the operational pressure profile.

The integrally geared compression system 201 can be used to control or adjust the operational pressure profile of the gasifier 205 such that a circulation flow rate through the gasifier 205 can be maintained between predetermined ranges. Controlling the operational pressure profile of the gasifier 205 to maintain the circulation flow rate can include maintaining the pressure differentials between the inlets, the outlets, and/or the purge nozzles disposed about the gasifier 205. For example, the pressure of a raw syngas in line 226 can be maintained at levels of about 34.5 kPa to about 275.8 kPa higher or lower than the pressure of a feedstock in line 222 and/or an oxidant in line 224. In another example, the pressure of the raw syngas in line 226 can be maintained at levels of about 13.8 kPa to about 344.7 kPa higher or lower than the pressure within the feedstock in line 222 and/or the oxidant in line 224. In another example, the pressure of the raw syngas in line 226 can be maintained at levels of about 68.9 kPa to about 206.8 kPa higher or lower than the pressure of the feedstock in line 222 and/or the oxidant in line 224. In another example, the pressure of the raw syngas in line 226 can be maintained at levels of about 13.8 kPa to about 20.7 kPa higher or lower than the pressure of the feedstock in line 222 and/or the oxidant in line 224.

The pressure of one or more secondary fluids in lines 245, 247, and/or 249 can be maintained at levels of from about 34.5 kPa to about 275.8 kPa higher or lower than the pressure of the feedstock in line 222 and/or the oxidant in line 224. The pressure of the one or more secondary fluids in lines 245, 247, and/or 249 can be maintained at levels of about 34.5 kPa to about 344.7 kPa higher or lower than the pressure of the feedstock in line 222 and/or the oxidant in line 224. The pressure of the one or more secondary fluids in lines 245, 247, and/or 249 can be maintained at levels of about 68.9 kPa to about 206.8 kPa higher or lower than the pressure of the feedstock in line 222 and/or the oxidant line 224. The pressure of the one or more secondary fluids in lines 245, 247, and/or 249 can be maintained at levels of from about 13.8 kPa to about 68.9 kPa higher or lower than the pressure of the feedstock in line 222 and/or the oxidant in line 224.

The integrally geared compression system 201 can maintain the pressure of the raw syngas in line 226 at a level of from about 1%, about 2%, about 3%, about 4%, about 5%, about 10%, about 15%, about 20%, about 25%, about 30%, or more, higher or lower than the pressure of the feedstock in line 222 and/or the oxidant in line 224. For example, the pressure of the raw syngas in line 226 can be maintained at levels of about 5% to about 40%, about 10% to about 30%, or about 10% to about 20% higher or lower than the pressure of the feedstock in line 222 and/or the oxidant in line 224.

The integrally geared compression system 201 can maintain the pressure of the one or more secondary fluids in lines 245, 247, and/or 249 at levels of from about 1%, about 2%, about 3%, about 4%, about 5%, about 10%, about 15%, about 20%, about 25%, about 30%, or more, higher or lower than the pressure of the feedstock in line 222 and/or the oxidant in line 224. For example, the pressure of the one or more secondary fluids in lines 245, 247, and/or 249 can be maintained at levels of about 5% to about 40%, about 10% to about 30%, or about 10% to about 20% higher or lower than the pressure of the feedstock in line 222 and/or the oxidant in line 224.

The gasifier 205 can include one or more independent reactor trains (one is shown) arranged in series or parallel use for fluidizing one or more particulates therein. Each independent reactor train can include one or more oxidizing zones 202, oxygen depleted zones 204, mixing zones 206, risers 208, and separators 212. Each reactor train can be operated independently or operated where any one or more of the oxidizing zones 202, oxygen depleted zones 204, mixing zones 206, risers 208, and/or separators 212 can be shared. For simplicity and ease of description, embodiments of the gasifier 205 will be further described in the context of a single reactor train.

One or more feedstocks via line 222 and one or more oxidants via line 224 can be introduced to the gasifier 205 as the primary fluid to produce a raw syngas via line 226. At least a portion of the feedstock via line 222 can be introduced to the oxygen depleted zone 204, riser 208, and/or one or more transition lines 214. Although not shown, at least a portion of the feedstock via line 222 and the oxidant via line 224 can be combined in the mixing zone 206 to provide a gas mixture, which can be at least partially combusted to produce heat. The feedstock via line 222 and oxidant via line 224 can be injected separately to the mixing zone 206 or mixed (not shown) prior to injection into the mixing zone 206. The feedstock and oxidant can be injected sequentially or simultaneously into the gasifier 205. Introduction of the feedstock via line 222 and oxidant via line 224 to the gasifier 205 can be continuous or intermittent depending on desired product types and grades.

The term "feedstock" as used herein refers to a raw material, whether solid, gas, liquid, or any combination thereof. The feedstock via line 222 can include particulates of one or more carbonaceous materials and/or derivatives thereof. Illustrative carbonaceous materials can include, but are not limited to, biomass (i.e., plant and/or animal matter or plant and/or animal derived matter); coal (high-sodium and low-sodium lignite, lignite, subbituminous, and/or anthracite, for example); oil shale; coke; tar; asphaltenes; low ash or no ash polymers; hydrocarbon-based polymeric materials; biomass derived material; or by-product derived from manufacturing operations. The hydrocarbon-based polymeric materials can include, for example, thermoplastics, elastomers, rubbers, including polypropylenes, polyethylenes, polystyrenes, including other polyolefins, homo polymers, copolymers, block copolymers, and blends thereof; PET (polyethylene terephthalate), poly blends, poly-hydrocarbons containing oxygen; heavy hydrocarbon sludge and bottoms products from petroleum refineries and petrochemical plants such as hydrocarbon waxes; blends thereof, derivatives thereof, and combinations thereof.

The feedstock via line 222 can include a mixture or combination of two or more carbonaceous materials (i.e., carbon-containing materials). The feedstock can include a mixture or combination of two or more low ash or no ash polymers, biomass derived materials, or by-products derived from manufacturing operations. The feedstock can include one or more recycled plastics such as polypropylene, polyethylene, polystyrene, derivatives thereof, blends thereof, or any combination thereof. Accordingly, the process can be useful for accommodating mandates for proper disposal of previously manufactured materials.

The feedstock via line 222 can be a dry feed 211 or can be conveyed to the gasifier 205 as a slurry mixed with a compressed or motive fluid, as depicted, or in any suspension. For example, the feedstock can be dried, e.g., to 18% moisture, and then pulverized by milling units such as one or more parallel bowl mills (not shown) prior to feeding to the gasifier 205. The feedstock can have an average particle diameter size of from about 50 microns to about 500 microns, from about 100 microns to about 400 microns, or from about 200 microns to about 300 microns.

Suitable oxidants in line 224 can include, but are not limited to, air, oxygen, essentially oxygen, oxygen-enriched air, mixtures of oxygen and air, mixtures of oxygen and inert gas such as nitrogen and argon, hydrogen peroxide, ozone, or any combination thereof. The oxidant can contain about 65 vol % oxygen or more, about 70 vol % oxygen or more; about 75 vol % oxygen or more, about 80 vol % oxygen or more, about 85 vol % oxygen or more, about 90 vol % oxygen or more, about 95 vol % oxygen or more, or about 99 vol % oxygen or more. As used herein, the term "essentially oxygen" refers to air containing 51 vol % oxygen or more. As used herein, the term "oxygen-enriched air" refers to air containing 21 vol % oxygen to about 50 vol % oxygen. Oxygen-enriched air and/or essentially oxygen can be obtained, for example, from cryogenic distillation of air, pressure swing adsorption, membrane separation, or any combination thereof.

In one or more embodiments, the oxidants via line 224 can be nitrogen-free or essentially nitrogen-free. By "essentially nitrogen-free," it is meant that the oxidant via line 224 contains about 5 vol % nitrogen or less, about 4 vol % nitrogen or less, about 3 vol % nitrogen or less, about 2 vol % nitrogen or less, or about 1 vol % nitrogen or less.

The oxidant via line 224 can be introduced into the mixing zone 206 at a rate suitable to control the temperature of the mixing zone 206. The molar ratio of the oxidant to carbon can be maintained at a sub-stoichiometric ratio to favor the formation of carbon monoxide over carbon dioxide in the mixing zone 206. The oxygen supplied via the oxidant to the mixing zone 206 can be less than five percent of the stoichiometric amount of oxygen required for complete combustion of all the carbon supplied to the mixing zone 206. Excess oxygen and/or steam in the mixing zone 206 can be consumed by the recirculating solids, stabilizing reactor temperature during operation and periods of feed interruption if any.

The gasification system 200 can also include one or more pressure instruments (three are shown 242, 243, 244) disposed about the gasifier 205. The one or more pressure instruments 242, 243, 244 can be used to monitor pressures within the gasifier 205. The one or more pressure instruments 242, 243, 244 can interface one or more purge nozzles (three are shown 248, 251, 253, respectively). The one or more purge nozzles 248, 251, 253 can be used to introduce one or more secondary fluids to the reactor train via lines 245, 247, 249 respectively. For example, the secondary fluid in line 249 can be used as a purge fluid or stream for nozzle 253 and a motive fluid for a j-leg 218. The one or more secondary fluids in lines 245, 247, 249 can, among other things, purge or clear material build up from the purge nozzles 248, 251, 253. By clearing material buildup, interference by one or more materials carried throughout the reaction train with the pressure instruments 242, 243, 244 can be mitigated or avoided.

Suitable secondary fluids can include, but are not limited to, air, steam, nitrogen, argon, a slip stream from the primary fluid, a slip stream from the raw syngas in line 226, syngas recovered further downstream, e.g., purified syngas, other process vapors, or any combination thereof. In one or more embodiments, the secondary fluid can contain about 65 vol % nitrogen or more, about 70 vol % nitrogen or more, about 75 vol % nitrogen or more, about 80 vol % nitrogen or more, about 85 vol % nitrogen or more, about 90 vol % nitrogen or more, about 95 vol % nitrogen or more, or about 99 vol % nitrogen or more. In one or more embodiments, the secondary fluid can contain about 65 vol % steam or more, about 70 vol % steam or more, about 75 vol % steam or more, about 80 vol % steam or more, about 85 vol % steam or more, about 90 vol % steam or more, about 95 vol % steam or more, or about 99 vol % steam or more.

One or more sorbents can also be added to the gasifier 205. In one or more embodiments, the sorbents can be added to capture contaminants from the syngas, such as sodium vapor in the gas phase within the gasifier 205. In one or more embodiments, the sorbents can be used to dust or coat feedstock particles in the gasifier to reduce the tendency for the particles to agglomerate. In one or more embodiments, the oxidant via line 224 can be introduced at the bottom of the mixing zone 206 to increase the temperature within the mixing zone 206 and riser 208 by combusting at least a portion of any carbon contained on the recirculated particulates. The sorbents can be ground to an average particle size of about 5 microns to about 100 microns, or about 10 microns to about 75 microns. Illustrative sorbents can include, but are not limited to, carbon rich ash, limestone, dolomite, and coke breeze. Residual sulfur released from the feedstock can be captured by native calcium in the feed or by a calcium based sorbent to form calcium sulfide.

The residence time and temperature in the gasifier 205 can be sufficient for water-gas shift reaction to reach equilibrium. The residence time of the feedstock in the mixing zone 206 can be greater than about 2 seconds, about 5 seconds, or about 10 seconds. The operating temperature of the gasifier 205 can range from a low of about 600° C., about 700° C., or about 800° C. to a high of about 1,000° C., about 1,100° C., about 1,200° C., or about 1,300° C. In one or more embodiments, the operating temperature of the gasifier 205 can range from about 700° C. to about 1,300° C., about 800° C. to about 1,200° C., about 900° C. to about 1,100° C., or about 750° C. to about 1,150° C.

In one or more embodiments, the gasifier 205 can be operated within a temperature range sufficient to not melt the ash, such as from about 560° C. to about 1,040° C., or from about 840° C. to about 930° C. Heat can be supplied by burning at least a portion of the carbon on the recirculated solids in the lower part of the mixing zone 206 before the recirculated solids contact the feedstock introduced via line 222. Start-up can be initiated by bringing the mixing zone 206 to a temperature from about 510° C. to about 650° C. and optionally by feeding coke breeze or the equivalent to the mixing zone 206 to further increase the temperature of the mixing zone 206 to about 900° C. One or more start-up heater 228 can also be used to heat the mixing zone to a desired start-up temperature.

The operating temperature of the gasifier 205 can be controlled by the recirculation rate and residence time of the solids within the riser 208; by reducing the temperature of the ash prior to recycle of the ash via line 218 to the mixing zone 206, by the addition of steam to the mixing zone 206, and/or by the addition of oxidant to the mixing zone 206. The recirculating solids can also heat the incoming feedstock which in turn can also minimize tar formation.

In one or more embodiments, the mixing zone 206 can be operated at pressures from about 50 kPa to about 4,500 kPa to increase thermal output per unit reactor cross-sectional area and enhance energy output in any subsequent power cycle. In one or more embodiments, the mixing zone 206 can be operated at a pressure of about 700 kPa to about 3,800 kPa, about 700 kPa to about 3,100 kPa, or about 700 kPa to about 2,400 kPa.

The gas suspension can move through the mixing zone 206 and into the riser 208 where additional residence time allows additional gasification, methane/steam reforming, tar cracking, and/or water-gas shift, reactions to occur. The riser 208 can operate at a higher temperature than the mixing zone 206, and can have a smaller diameter than the mixing zone 206. The superficial gas velocity in the riser 208 can range from about 3 m/s to about 30 m/s, from about 6 m/s to about 25 m/s, from about 9 m/s to about 20 m/s, or from about 12 m/s to about 16 m/s.

The gas mixture can exit the riser 208 via transition line 214 and enter the separator 212 where the larger particles can be separated from the gas and be recycled back to the mixing zone 206 via one or more conduits, including, but not limited to, a standpipe 216, and/or j-leg 218. The separator 212 can be or include one or more cyclones, desalters, and/or decanters. In one or more embodiments, one or more particulate transfer devices (not shown), such as one or more loop seals, can be located downstream of the separator 212 to collect separated particulate fines. In one or more embodiments, the j-leg 218 can include a non-mechanical "j-valve" to increase the effective solids residence time, increase the carbon conversion, and/or minimize aeration requirements for recycling solids to the mixing zone 206.

In one or more embodiments, the average particle size of the feedstock can be used as a control variable to optimize particulate density of the solids recycled to the mixing zone via the standpipe 216. The feedstock particle size can be varied to optimize the particulate mass circulation rate, and to improve the flow characteristics of the gas mixture within the mixing zone 206 and riser 208.

The raw syngas via line 226 produced in the gasifier 205 can include carbon monoxide, carbon dioxide, hydrogen, oxygen, hydrocarbons, sulfur, solids, mixtures thereof, derivatives thereof, or combinations thereof. The syngas produced in the gasifier 205 can be essentially nitrogen-free. The gasification process can convert at least about 85%, about 90%, about 95%, about 98%, or about 99% of the carbon from the feedstock to syngas.

The raw syngas produced in the gasifier 205 can contain about 5 vol % to about 50 vol % carbon monoxide, about 15 vol % to about 40 vol % carbon monoxide, or about 20 vol % to about 30 vol % carbon monoxide. The syngas can contain about 5 vol % to about 25 vol % hydrogen, about 10 vol % to about 25 vol % hydrogen, or about 10 vol % to about 20 vol % hydrogen. The syngas can contain about 0.5 vol % to about 3.0 vol % nitrogen, about 0.5 vol % to about 2.0 vol % nitrogen, or about 1.5 vol % to about 3.0 vol % nitrogen. The syngas can contain about 1 vol % to about 20 vol % methane, about 5 vol % to about 15 vol % methane, or about 5 vol % to about 10 vol % methane. The syngas can contain less than about 30 vol % carbon dioxide, less than about 25 vol % carbon dioxide, less than about 20 vol % carbon dioxide, less than about 15 vol % carbon dioxide, or less than about 10 vol % carbon dioxide.

In one or more embodiments, the raw syngas can have a heating value, corrected for heat losses and dilution effects, of about 1,863 kJ/m$^3$ (50 Btu/scf) to about 2,794 kJ/m$^3$ (75 Btu/scf); about 1,863 kJ/m$^3$ to about 3,726 kJ/m$^3$ (100 Btu/scf); about 1,863 kJ/m$^3$ to about 4,098 kJ/m$^3$ (110 Btu/scf); about 1,863 kJ/m$^3$ to about 5,516 kJ/m$^3$ (140 Btu/scf); about 1,863 kJ/m$^3$ to about 6,707 kJ/$^3$ (180 Btu/scf); about 1,863 kJ/m$^3$ to about 7,452 kJ/m$^3$ (200 Btu/scf); about 1,863 kJ/m$^3$ to about 9,315 kJ/m$^3$ (250 Btu/scf); about 1,863 kJ/m$^3$ to about 10,246 kJ/m$^3$ (275 Btu/scf), 1,863 kJ/m$^3$ to about 11,178 kJ/m$^3$ (300 Btu/scf), or about 1,863 kJ/m$^3$ to about 14,904 kJ/m$^3$ (400 Btu/scf). The syngas can be used as a fuel to generate electricity, steam and/or as a source of hydrogen.

Steam can be supplied to the gasifier 205 to control the hydrogen to carbon monoxide ratio ($H_2$:CO) within the gasifier 205. Since the outlet temperature of the gasifier 205 is proportionately less than comparable gasifiers (i.e., slag type), the amount of thermal heat versus chemical heat in the syngas is comparably less in the gasifier 205. Therefore, steam can be used to adjust the $H_2$:CO ratio with a smaller energy penalty than other entrained flow gasifiers operating at higher temperatures. Because of the reduced operating temperature within the gasifier (i.e., less than 800° C.), less energy is consumed to control and optimize the $H_2$:CO ratio, thus the production of hydrogen can be increased without a commensurate increase in steam demand within the gasifier 205. For example, the synthesis gas leaving the gasifier 205 can have a $H_2$:CO of at least 0.2. In one or more embodiments, the $H_2$:CO ratio is between about 0.25 to about 2.5, between about 0.4 to about 2.0, between about 0.5 to about 1.5, or between about 0.8 to about 1.0.

Figure 3:
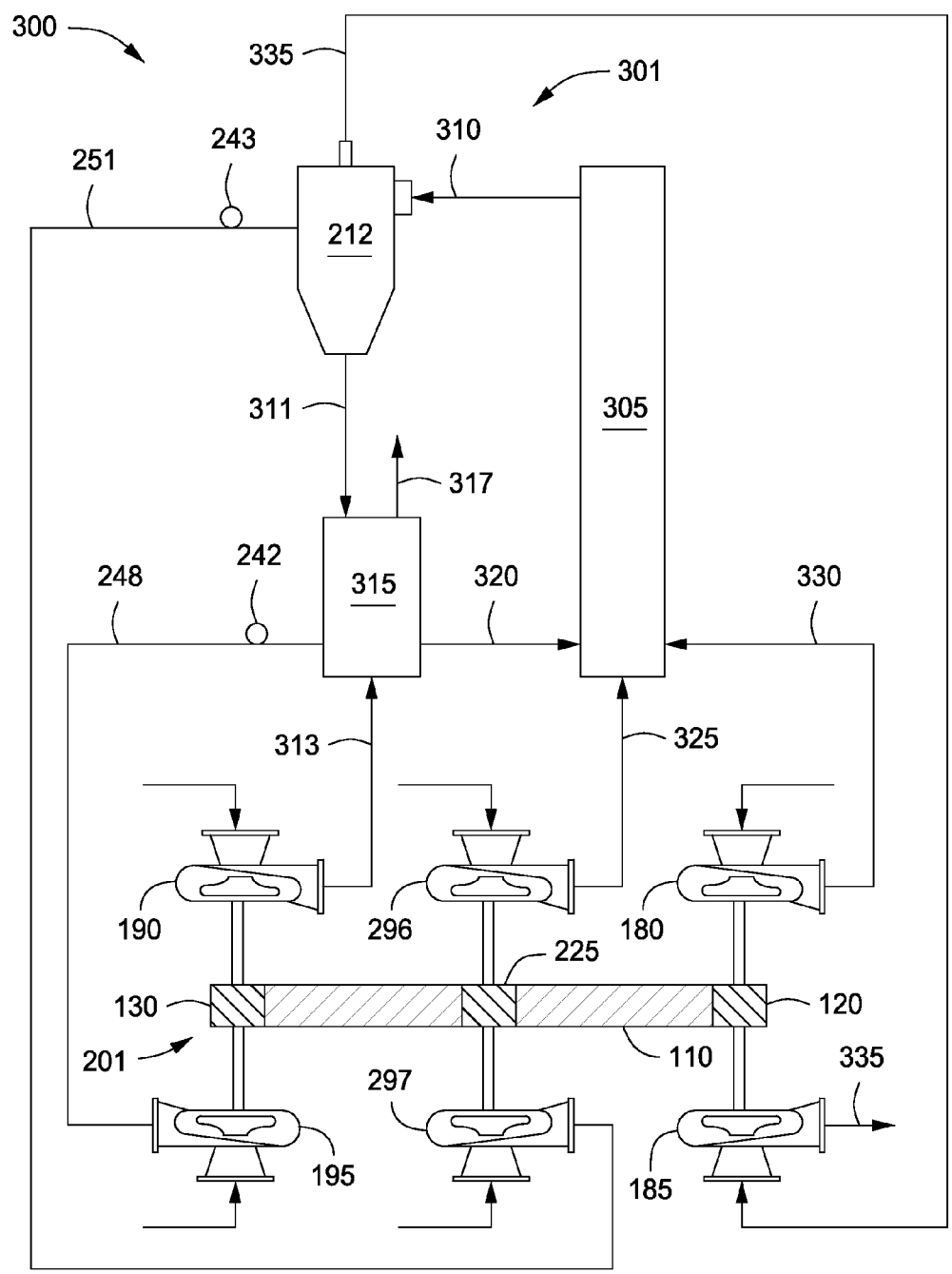
FIG. 3 depicts a schematic view of an illustrative fluid catalytic cracking system, according to one or more embodiments described.

FIG. 3 depicts a schematic view of an illustrative fluid catalytic cracking system 300, according to one or more embodiments. The fluid catalytic cracking (FCC) system 300 can include one or more fluid catalytic crackers 301 (one is shown) for fluidizing one or more particulates and the one or more integrally geared compression systems 201 (one is shown). The fluid catalytic cracker 301 can include one or more reaction risers or risers 305, one or more ducts 310, one or more separators 212, and one or more regenerators 315. The integrally geared compression system 201 can control the pressure profile of the fluid catalytic cracker 301 and/or the pressure of one or more inlets, one or more outlets, and/or one or more purge nozzles within the FCC system 300. For example, the integrally geared compression system 201 can be used to control the pressure between an inlet of the riser 305 and an outlet of the separator 212 or from every inlet and every outlet of the FCC system 300. The integrally geared compression system 201 can be used to control the pressure between a first purge nozzle 248, a second purge nozzle 251, and an outlet of the separator 212. The integrally geared compression system 201 can be used to control the pressure between an inlet of the riser 305, the first purge nozzle 248, the second purge nozzle 251, and an outlet of the separator 212.

The integrally geared compression system 201 can be used to control or adjust the operational pressure profile of the fluid catalytic cracker 301 such that a circulation flow rate through the fluid catalytic cracker 301 can be maintained between predetermined ranges. Maintaining the circulation flow rate of the fluid catalytic cracker 301 can include maintaining the pressure differentials between inlets, outlets, and/or purge nozzles disposed about the FCC system 300. For example, the pressure of a product in line 335 can be maintained at levels of about 34.5 kPa to about 275.8 kPa higher or lower than the pressure of a feedstock in line 330 and/or a steam in line 325. In another example, the pressure of the product in line 335 can be maintained at levels of about 13.8 kPa to about 344.7 kPa higher or lower than the pressure within the feedstock in line 330 and/or the steam in line 325. In another example, the pressure of the product in line 335 can be maintained at levels of about 68.9 kPa to about 206.8 kPa higher or lower than the pressure of the feedstock in line 330 and/or the steam in line 325. In another example, the pressure of the product in line 335 can be maintained at levels of about 13.8 kPa to about 20.7 kPa higher or lower than the pressure of the feedstock in line 330 and/or the steam in line 325.

The pressure of a catalyst in line 320 can be maintained at levels of about 34.5 kPa to about 275.8 kPa higher or lower than the pressure within the riser 305. In another example, the pressure of the catalyst in line 320 can be maintained at levels of about 13.8 kPa to about 344.7 kPa higher or lower than the pressure within the riser 305. In another example, the pressure of the catalyst in line 320 can be maintained at levels of about 68.9 kPa to about 206.8 kPa higher or lower than the pressure within the riser 305. In another example, the pressure of the catalyst in line 320 can be maintained at levels of about 13.8 kPa to about 20.7 kPa higher or lower than the pressure within the riser 305.

The pressure of one or more secondary fluids in lines 248, 251, and/or 313 can be maintained at levels of from about 34.5 kPa to about 275.8 kPa higher or lower than the pressure of the feedstock in line 330 and/or the steam in line 325. The pressure of the one or more secondary fluids in lines 248, 251, and/or 313 can be maintained at levels of about 34.5 kPa to about 344.7 kPa higher or lower than the pressure of the feedstock in line 330 and/or the steam in line 325. The pressure of the one or more secondary fluids in lines 248, 251, and/or 313 can be maintained at levels of about 68.9 kPa to about 206.8 kPa higher or lower than the pressure of the feedstock in line 330 and/or the steam in line 325. The pressure of the one or more secondary fluids in lines 248, 251, and/or 313 can be maintained at levels of from about 13.8 kPa to about 68.9 kPa higher or lower than the pressure of the feedstock in line 330 and/or the steam in line 325.

The integrally geared compression system 201 can maintain the pressure of the product in line 335 at a level of from about 1%, about 2%, about 3%, about 4%, about 5%, about 10%, about 15%, about 20%, about 25%, about 30%, or more, higher or lower than the pressure of the feedstock in line 330 and/or the steam in line 325. For example, the pressure of the product in line 335 can be maintained at levels of about 5% to about 40%, about 10% to about 30%, or about 10% to about 20% higher or lower than the pressure of the feedstock in line 330 and/or the steam in line 325.

The integrally geared compression system 201 can maintain the pressure of the one or more secondary fluids in lines 248, 251, and/or 313 at levels of from about 1%, about 2%, about 3%, about 4%, about 5%, about 10%, about 15%, about 20%, about 25%, about 30%, or more, higher or lower than the pressure of the feedstock in line 330 and/or the steam in line 325. For example, the pressure of the one or more secondary fluids in lines 248, 251, and/or 313 can be maintained at levels of about 5% to about 40%, about 10% to about 30%, or about 10% to about 20% higher or lower than the pressure of the feedstock in line 330 and/or the steam in line 325.

From the integrally geared compression system 201, steam via line 325, the feedstock via line 330, and one or more catalysts (in particulate or other form) via line 320 can be introduced to the riser 305 to form a fluidized mixture ("reaction mixture") therein. The steam via line 325 and the catalyst via line 320 can be introduced separately to the riser 305 or the steam and the catalyst can be mixed and introduced together as a mixture to the riser 305, as shown in FIG. 3.

Heat in the riser 305 provided by the steam via line 325 and the catalyst via line 320 can vaporize at least a portion of the feedstock introduced via line 330, to provide the reaction mixture therein. Supplemental heat can be provided to the one or more risers 305 using waste heat (not shown) provided from the regenerator 315. Within the riser 305, the hydrocarbons within the reaction mixture can be cracked into one or more hydrocarbons and hydrocarbon by-products to provide a first product mixture via duct 310. At least a portion of the hydrocarbon by-products present in the riser 305 can deposit on the surface of the catalyst particulates to form coked-catalyst particulates or spent catalyst. Thus, the first product mixture exiting the riser 305 can contain coked-catalyst particulates suspended in gaseous hydrocarbons, hydrocarbon by-products, carbon dust or particulates, steam, and/or other inerts. As such, the first product mixture in duct 310 can be a reduced or reducing environment of gaseous hydrocarbons.

The amount of coke or carbon deposited on the catalyst particulates can range from a low of about 0.01 wt %, about 0.1 wt %, or about 0.5 wt % to a high of about 1 wt %, about 1.5 wt %, or about 2 wt %. For example, the amount of coke deposited on the catalyst particulates can range from about 0.5 wt % to about 1.5 wt %, from about 0.7 wt % to about 1.3 wt %, or from about 0.9 wt % to about 1.1 wt % based on the total weight of the carbon deposits and the catalyst particulates.

The catalyst-to-hydrocarbon weight ratio can range from about 2:1 to about 20:1, from about 3:1 to about 10:1, or from about 4:1 to about 8:1. The riser 305 can be operated at a temperature ranging from a low of about 425° C., about 450° C. about 475° C., or about 500° C. to a high of about 600° C., about 675° C., about 700° C., or about 825° C. For example, the riser 305 can be operated at a temperature ranging from about 300° C. to about 675° C., from about 550° C. to about 700° C., from about 605° C. to about 670° C. from about 610° C. to about 660° C., from about 580° C. to about 700° C., from about 600° C. to about 680° C., or from about 615° C. to about 650° C. In another example, the riser 305 can be operated at a temperature of about 605° C., about 615° C., about 625° C., about 630° C., about 640° C., or about 650° C.

The velocity of the reaction mixture flowing through the riser 305 can range from about 3 msec to about 27 m/sec, about 6 msec to about 25 msec, or about 9 msec to about 21 m/sec. The residence time of the reaction mixture in the riser 305 can be less than about 20 seconds, less than about 10 seconds, less than about 8 seconds, less than about 4 seconds, or less than about 2 seconds.

The first product mixture can flow, via the duct (or transition line) 310, to the one or more separators 212 where the coked-catalyst particulates and/or other particulates can be separated from the gaseous hydrocarbons, steam, and inerts. The separator 212 can have a larger cross-sectional area than the riser 305, and/or the duct 310, which can reduce the velocity of the first product mixture, allowing the heavier coked-catalyst particulates and/or other particulates to separate from the gaseous hydrocarbons, steam, and inerts. In one or more embodiments, a steam purge (not shown) can be added to the separator 212 to assist in separating the gaseous hydrocarbons from the coked-catalyst particulates, i.e., stripping the gaseous hydrocarbons from the solids. In other words, the separator 212 can be a self-stripping separator.

The gaseous hydrocarbons ("first product") via line 335 can be recovered from the separator 212. Although not shown, in one or more embodiments, the first product in line 335 can be further processed, such as by dehydrating or fractionating to produce one or more finished products including, but not limited to, one or more olefins, paraffins, aromatics, mixtures thereof, and/or combinations thereof. For example, the first product via line 335 can be introduced to a quench tower that can quench the first product and separate entrained catalyst particulates therefrom. Entrained catalyst particulates separated from the first product can be recycled back to the riser 305 and/or to the regenerator 315. A suitable fluid catalytic cracker 301 having a quench tower for quenching and separating entrained catalyst particulates from the first product 335 can be as discussed and described in U.S. Pat. No. 7,153,479.

The separator 212 can separate about 99%, about 99.5%, about 99.9%, about 99.99%, or about 99.999% of the particulates from the first product mixture via the duct 310. For example, the separator 212 can separate about 99.9% to about 99.997%, about 99.95% to about 99.996%, or about 99.95% to about 99.99% of the particulates from the first product mixture via the duct 310.

The solids, i.e., coked-catalyst particulates, can free fall through the particulate discharge line 311 of the separator 212 and can be introduced to the regenerator 315. The coked-catalyst particulates introduced via the particulate discharge line 311 can be combined with a secondary fluid introduced via line 313 within the regenerator 315 to provide a flue gas via line 317 and regenerated catalyst via line 320. The secondary fluid introduced via line 313 can include one or more oxidants and/or supplemental fuel. Illustrative oxidants can include, but are not limited to, air, oxygen, mixtures of air or oxygen and other gases such as nitrogen, and/or oxygen enriched air. The supplemental fuel can include any combustible material. For example the supplemental fuel can include, but is not limited to, $C_1$ to $C_{20}$ hydrocarbons and/or carbon. The supplemental fuel can be introduced as a liquid, gas, solid, or any combination thereof to the regenerator 315. The one or more oxidants can react with the carbonaceous matter on the coked-catalyst particulates to combust or otherwise burn at least a portion of any carbon ("coke") off the surface of the catalyst particulate. Should supplemental fuel be introduced, the one or more oxidants can react with the supplemental fuel to combust the supplemental fuel and generate heat. The removal of the coke from the surface of the catalyst particulates can re-expose the reactive surfaces of the catalyst particulates, thereby "regenerating" the catalyst particulate and permitting reuse thereof. Combustion by-products, such as carbon monoxide, nitrogen oxides, nitrogen oxide precursors, and carbon dioxide, can be removed from the regenerator 315 as the waste or flue gas via line 317. The regenerated catalyst particulates can be recovered via line 320, which can be recycled to the riser 305. In one or more embodiments, fresh, unused, catalyst can be added (not shown) to the regenerator 315, the regenerated catalyst in line 320, and/or to the riser 305.

The regenerator 315 can be operated in full burn mode, partial burn mode, or anywhere in between. Operating the regenerator 315 in a full burn mode can provide the waste gas or flue gas via line 317 which can contain a larger amount of nitrogen oxides ("NOx") and NOx precursors and a decreased amount of carbon monoxide (CO) relative to the partial burn mode. Operating the regenerator 315 in a partial burn mode can provide the waste gas or flue gas via line 317 which can contain a larger amount of CO and a lesser amount of NOx and NOx precursors relative to the full burn mode. Operating the regenerator 315 in between the two extremes of full burn and partial burn can provide the waste or flue gas via line 317 that contains less NOx and NOx precursors and more CO when compared to the full burn mode. In one or more embodiments, the NOx gases can include, but are not limited to, NO, $NO_2$, and $N_2O$. In one or more embodiments, the NOx precursors can include, but are not limited to, HCN, $NH_3$, CN, and HNO.

The flue gas via line 317 can be introduced to one or more optional CO boilers (not shown) to remove additional CO. The one or more CO boilers can be any type of CO boiler, which are well-known. The CO boiler can be operated in multiple stages to reduce the flame temperature occurring in any one stage and limit NOx formation in an oxidizing atmosphere. Low NOx burners can also be used to burn the fuel gas (not shown) which may be needed to keep the CO boiler lit. Ammonia or an ammonia precursor such as urea can be introduced (not shown) to the optional CO boiler to reduce NOx even further. These materials can react quickly with NOx and NOx precursors to reduce it to nitrogen. Additional details for conventional FCC processes and flue gas treatment can be as discussed and described in U.S. Pat. No. 5,268,089.

At least a portion of the flue gas via line 317 and/or flue gas from the one or more optional CO boilers can be vented to the atmosphere and/or sent to a heat recovery unit (not shown) and then vented to the atmosphere, sequestered under ground, or otherwise stored and/or disposed. The one or more optional CO boilers, if used, can reduce the CO content of the flue gas in line 317 by about 5 wt %, about 10 wt %, about 15 wt %, about 20 wt %, about 25 wt %, about 30 wt %, about 35 wt %, about 40 wt %, about 45 wt %, or about 50 wt %. For example, the one or more optional CO boilers can reduce the CO content of the flue gas in line 317 by from about 5 wt % to about 90 wt %; from about 5 wt % to about 75 wt %; from about 5 wt % to about 60 wt %; or from about 5 wt % to about 50 wt %. The CO reductions referred to in this paragraph are on the basis of the weight of the CO in the flue gas alone.

Although not shown, in one or more embodiments. a carbon dioxide ($CO_2$) separation unit can be used to remove at least a portion of the $CO_2$ from the flue gas in line 317. For example, $CO_2$ can be removed for sequestration or reuse, e.g., reuse through enhanced oil recovery.

The fluid catalytic cracker 301 can also include one or more optional heat recovery units (not shown) that can include any device, system, or combination of systems and/or devices suitable for transferring heat from a fluid at a higher temperature to a fluid at a lower temperature. The heat recovery unit can include, but is not limited to, single or multiple pass heat exchange devices such as shell and tube heat exchangers, plate and frame heat exchangers, spiral heat exchangers, bayonet type heat exchangers, U-tube heat exchangers, and/or any similar system or device.

In one or more embodiments, a fluidized mixture, containing spent catalyst particulates, regenerated catalyst particulates, oxidants, carbon monoxide, carbon dioxide, nitrogen oxides, and/or the one or more fluids introduced via line 313 can be combined within the regenerator 315 with one or more optional doping agents introduced thereto (not shown). The dispersal and deposition of the one or more doping agents on the regenerated catalyst can be enhanced by the high temperature and fluid velocity present in the regenerator 315.

The selection of an appropriate doping agent or additive or blend of two or more doping agents or additives can be based, at least in part, upon the composition of the incoming feedstock via line 330, and/or desired gaseous hydrocarbons to be produced in the first product via line 335. For example, the addition of a class 2 doping agent such as magnesium or barium can preferentially increase the production of ethylene in the first product recovered via line 335. The addition of a class 13 doping agent, such as gallium, can result in increased production of aromatic hydrocarbons in the first product recovered via line 335. The addition of class 8, 9, or 10 doping agents such as ruthenium, rhodium, or palladium can preferentially increase the production of propylene in the first product recovered via line 335.

In one or more embodiments, doped catalyst particulates and/or regenerated catalyst particulates with or without one or more doping agents or additives can be recycled to the one or more risers 305 via line 320. The flow of regenerated catalyst particulates from the regenerator 315 can be controlled using one or more valves (not shown), which can be manually or automatically adjusted or controlled based upon parameters derived from process temperatures, pressures, flows and/or other process conditions. In one or more embodiments, at least 90 wt %, at least 95 wt %, at least 99 wt %, at least 99.99 wt %, at least 99.9975 wt %, or at least 99.999 wt % of the total regenerated catalyst particulates, makeup catalyst particulates, and/or doped catalyst particulates introduced to the riser 305 via line 320 can be regenerated, optionally doped with one or more doping agents, and recycled via line 320 back to the riser 305.

The feedstock in line 330 can be or include one or more carbonaceous materials or derivatives thereof such as one or more hydrocarbon compounds containing about 60 carbon atoms or less, about 40 carbon atoms or less, or about 20 carbon atoms or less. In at least one specific embodiment, the feedstock in line 330 can be or include hydrocarbon compounds containing from 1 to 16 carbon atoms or higher, 2 to 12 carbon atoms, or 4 to 8 carbon atoms. The feedstock in line 330 can include, but is not limited to, mixed olefins, paraffins, mixtures thereof, and/or any combination thereof. The feedstock in line 330 can be or include a liquid and/or gas mixture produced from the distillation of crude oil. The feedstock in line 330 can include from about 0.1 percent by volume ("vol. %") to 5 vol. % methane; from about 0.1 vol. % to about 10 vol. % ethane; from about 0.1 vol. % to about 30 vol. % propane. The feedstock in line 330 can contain from about 0 vol. % to about 35 vol. % butane; and from about 0 vol. % to about 20 vol. % pentane and heavier hydrocarbons. The feedstock in line 330 can include at least 60 wt % $C_2$-$C_{11}$ olefins and paraffins.

The hydrocarbon feedstock introduced via line 330 can be pre-heated prior to introduction to the riser 305. Although not shown, in at least one specific embodiment, a regenerative heat exchanger using waste process heat can be used to pre-heat the hydrocarbon feed introduced via line 335. The temperature of the h) drocarbon feed via line 330 can range from about 370° C. to about 790° C., about 425° C. to about 700° C., or about 500° C. to about 650° C. The pressure of the hydrocarbon feed via line 330 can range from about 100 kPa to about 3.450 kPa, about 100 kPa to about 2,450 kPa, or about 100 kPa to about 350 kPa.

The hydrocarbon feedstock introduced via line 330 can be partially or completely vaporized prior to introduction to the one or more risers 305. For example, the amount of the feedstock in line 330 that can be vaporized can range from a low of about 10 vol. %, about 20 vol. %, about 30 vol. %, or about 40 vol. %, to a high of about 70 vol. %, about 80 vol. %, about 90 vol. %, or about 100 vol. %. In another example, the hydrocarbon feed can be a minimum of 80 wt % vaporized; 85 wt % vaporized; 90 wt % vaporized; 95 wt % vaporized; or about 99 wt % vaporized prior to introduction to the riser 305. The pressure and temperature within the riser 305 can be adjusted either manually or automatically to compensate for variations in hydrocarbon feed composition and to maximize the yield of preferred hydrocarbons obtained by cracking the hydrocarbon feed in the presence of the one or more doped catalysts.

The steam introduced via line 325 to the riser 305 can be saturated. The pressure of the saturated steam can be a minimum of about 1,000 kPa, about 2,000 kPa, about 4,000 kPa, or about 6,000 kPa. The pressure of the saturated steam can range from about 100 kPa to about 8,300 kPa; about 100 kPa to about 4,000 kPa; or about 100 kPa to about 2,000 kPa.

The steam introduced via line 325 to the riser 305 can be superheated. The pressure of superheated steam can be a minimum of about 1,000 kPa, about 2,000 kPa, about 4,000 kPa, or about 6,000 kPa. The pressure of the superheated steam via line 325 can range from about 100 kPa to about 8,300 kPa; about 100 kPa to about 4,000 kPa; or about 100 kPa to about 2,000 kPa. The temperature of the superheated steam via line 325 can be a minimum of about 200° C., about 230° C., about 260° C., or about 290° C.

The steam can be introduced via line 325 to the riser 305 at a rate proportionate to the hydrocarbon feed rate introduced via line 330. The steam-to-hydrocarbon feed weight ratio can range from about 1:20 to about 50:1; from about 1:20 to about 20:1; or from about 1:10 to about 20:1. The steam-to-hydrocarbon feed weight ratio can remain constant or can vary.

The first product via line 335 can include from about 5 wt % to about 30 wt % $C_2$; about 5 wt % to about 60 wt % $C_3$; about 5 wt % to about 40 wt % $C_4$; about 5 wt % to about 50 wt % Cs, and heavier hydrocarbons. In one or more embodiments, the temperature of the first product in line 335 can range from a low of about 350° C., about 400° C., or about 450° C. to a high of about 550° C., about 300° C., or about 700° C.

Embodiments described herein further relate to any one or more of the following paragraphs:

1. A method for operating a transport reactor, comprising: fluidizing one or more particulates within a transport reactor, wherein the one or more particulates comprise one or more carbonaceous materials; maintaining one or more pressure differentials between two or more points within the transport reactor using at least one integrally geared compression system, the at least one integrally geared compression system comprising: a bull gear; at least one pinion; and two or more compressors.

2. The method according to paragraph 1, wherein the one or more pressure differentials make up an operational pressure profile of the transport reactor.

3. The method according to paragraph 1 or 2, wherein the transport reactor is a gasifier.

4. The method according to any one of paragraphs 1 to 3, wherein the transport reactor is a fluid catalytic cracker.

5. The method according to any one of paragraphs 1 to 4, further comprising diverting a portion of a raw product from the transport reactor for use as an energy source for rotating the bull gear.

6. A method for operating a transport reactor, comprising: fluidizing one or more particulates within a transport reactor, wherein the one or more particulates comprise one or more carbonaceous materials; controlling a pressure of one or more fluids to and one or more products from the transport reactor, using at least one integrally geared compression system, the at least one integrally geared compression system comprising: a bull gear; at least one pinion: two or more compressors; and a motor, wherein the bull gear is interconnected to the motor and the bull gear is coupled to the at least one pinion, and wherein the at least one pinion is interconnected to at least one of the two or more compressors.

7. The method according to paragraph 6, wherein the transport reactor is a gasifier.

8. The method according to paragraph 7, further comprising compressing a motive fluid within a feedstock prior to introducing the feedstock to the gasifier; compressing an oxidant prior to introducing the oxidant to the gasifier; and wherein the motive fluid is compressed by a first compressor of the integrally geared compression system and the oxidant is compressed by a second compressor of the at least one integrally geared compression system.

9. The method according to any one of paragraphs 6 to 8, wherein the transport reactor is a fluid catalytic cracker.

10. The method according to any one of paragraphs 6 to 9, further comprising controlling a pressure of one or more secondary fluids by introducing the one or more secondary fluids to the transport reactor using the at least one integrally geared compression system.

11. The method according to paragraph 10, wherein a first secondary fluid is a motive fluid and a second secondary fluid is a purge fluid.

12. The method according to paragraph 11, further comprising controlling the pressure of the second secondary fluid and introducing the second secondary fluid to one or more purge nozzles disposed about the transport reactor.

13. The method according to paragraph 11, wherein a first compressor controls the pressure of a first portion of the second secondary fluid and introduces the first portion to a first purge nozzle, and wherein a second compressor controls the pressure of a second portion of the second secondary fluid and introduces the second portion to a second purge nozzle.

14. The method according to any one of paragraphs 6 to 13, further comprising diverting a portion of a raw product from the transport reactor to the motor as an energy source for the motor.

15. The method according to any one of paragraphs 6 to 14, wherein two or more integrally geared compression systems control an operational pressure profile of the transport reactor.

16. A transport reactor system, comprising: a first transport reactor for fluidizing one or more particulates, wherein the one or more particulates comprise one or more carbonaceous materials or derivatives thereof; and at least one integrally geared compression system, the at least one integrally geared compression system comprising: a bull gear; at least one pinion; two or more compressors, wherein the at least one integrally geared compression system maintains an operational pressure profile of the first transport reactor.

17. The system according to paragraph 16, further comprising: a first compressor of the integrally geared compression system in fluid communication with a first inlet of the first transport reactor; and a second compressor of the integrally geared compression system in fluid communication with a second inlet of the first transport reactor.

18. The system according to paragraph 16 or 17, wherein the transport reactor is a gasifier.

19. The system according to any one of paragraphs 16 to 18, wherein the transport reactor is a fluid catalytic cracker.

20. The system according to any one of paragraphs 16 to 19, further comprising a second transport reactor, wherein two or more integrally geared compression systems maintain one or more pressure differentials between two or more points within the second transport reactor.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A method for operating a transport reactor, comprising:
    fluidizing one or more particulates within a transport reactor, wherein the one or more particulates comprise one or more carbonaceous materials;
    maintaining one or more pressure differentials between two or more points within the transport reactor using at least one integrally geared compression system, the at least one integrally geared compression system comprising:
        a bull gear;
        at least one pinion driven by the bull gear; and
        two or more compressors, each being driven by the at least one pinion; and
    circulating a primary fluid through the transport reactor using at least one of the two or more compressors,
    wherein the transport reactor is a fluid catalytic cracker, wherein a first compressor of the two or more compressors compresses a primary fluid flowing into the fluid catalytic cracker and a second compressor of the two or more compressors compresses a product flowing out of the fluid catalytic cracker, and wherein the same pinion drives the first compressor and the second compressor.

2. The method of claim 1, wherein the one or more pressure differentials make up an operational pressure profile of the transport reactor.

3. The method of claim 1, further comprising diverting a portion of a raw product from the transport reactor for use as an energy source for rotating the bull gear.

4. A method for operating a transport reactor, comprising:
    fluidizing one or more particulates within a transport reactor, wherein the one or more particulates comprise one or more carbonaceous materials;
    controlling a pressure of one or more fluids to and one or more products from the transport reactor, using at least one integrally geared compression system, the at least one integrally geared compression system comprising:
        a bull gear;
        at least one pinion driven by the bull gear;
        two or more compressors driven by the at least one pinion, wherein each of the two or more compressors is in fluid communication with the transport reactor; and
        a motor driving the bull gear; and
    controlling a pressure of one or more secondary fluids by introducing the one or more secondary fluids to the transport reactor using the at least one integrally geared compression system.

5. The method of claim 4, wherein the transport reactor is a gasifier, and further comprising:
    compressing a motive fluid within a feedstock prior to introducing the feedstock to the gasifier;
    compressing an oxidant prior to introducing the oxidant to the gasifier; and
    wherein the motive fluid is compressed by a first compressor of the two or more compressors and the oxidant is compressed by a second compressor of the two or more compressors.

6. The method of claim 4, wherein a first secondary fluid is a motive fluid and a second secondary fluid is a purge fluid.

7. The method of claim 6, further comprising controlling the pressure of the second secondary fluid and introducing the second secondary fluid to one or more purge nozzles disposed about the transport reactor.

8. The method of claim 6, wherein a first compressor of the two or more compressors controls the pressure of a first portion of the second secondary fluid and introduces the first portion to a first purge nozzle, and wherein a second compressor of the two or more compressors controls the pressure of a second portion of the second secondary fluid and introduces the second portion to a second purge nozzle.

9. The method of claim 4, further comprising diverting a portion of a raw product from the transport reactor to the motor as an energy source for the motor.

10. The method of claim 4, wherein two or more integrally geared compression systems control an operational pressure profile of the transport reactor.

11. A transport reactor system, comprising:
    a first transport reactor for fluidizing one or more particulates, wherein the one or more particulates comprise one or more carbonaceous materials; and
    at least one integrally geared compression system, the at least one integrally geared compression system comprising:
        a bull gear;
        at least one pinion driven by the bull gear;
        two or more compressors driven by the at least one pinion, wherein at least one of the two or more compressors is in fluid communication with the first transport reactor, wherein the at least one integrally geared compression system maintains an operational pressure profile of the first transport reactor,
    a second transport reactor, wherein two or more integrally geared compression systems maintain one or more pressure differentials between two or more points within the second transport reactor.

12. The system of claim 11, further comprising:
    a first compressor of the integrally geared compression system in fluid communication with a first inlet of the first transport reactor; and
    a second compressor of the integrally geared compression system in fluid communication with a second inlet of the first transport reactor.

13. The system of claim 11, wherein the transport reactor is a gasifier.

14. The system of claim 11, wherein the transport reactor is a fluid catalytic cracker.

15. The system of claim 11, further comprising:
    an inlet supplying a primary fluid into the first transport reactor; and
    an outlet flowing a product out of the first transport reactor, wherein at least one of the two or more compressors compresses one of: (i) the primary fluid, and (ii) the product.

16. A transport reactor system, comprising:
    a first transport reactor for fluidizing one or more particulates, wherein the one or more particulates comprise one or more carbonaceous materials; and
    at least one integrally geared compression system, the at least one integrally geared compression system comprising:
        a bull gear;
        at least one pinion driven by the bull gear;
        two or more compressors driven by the at least one pinion, wherein at least one of the two or more compressors is in fluid communication with the first transport reactor,
    wherein the at least one integrally geared compression system maintains an operational pressure profile of the first transport reactor, wherein a first compressor of the two or more compressors compresses the primary fluid and a second compressor of the two or more compressors compresses the product.

17. The system of claim 16, wherein the transport reactor is a gasifier.

18. The system of claim 16, wherein the transport reactor is a fluid catalytic cracker.

19. The system of claim 16, further comprising:
- an inlet supplying a primary fluid into the first transport reactor; and an outlet flowing a product out of the first transport reactor, wherein at least one of the two or more compressors compresses one of: (i) the primary fluid, and (ii) the product.

\* \* \* \* \*